P. EBY.
Transplanting-Box.
No. 160,088. Patented Feb. 23, 1875.
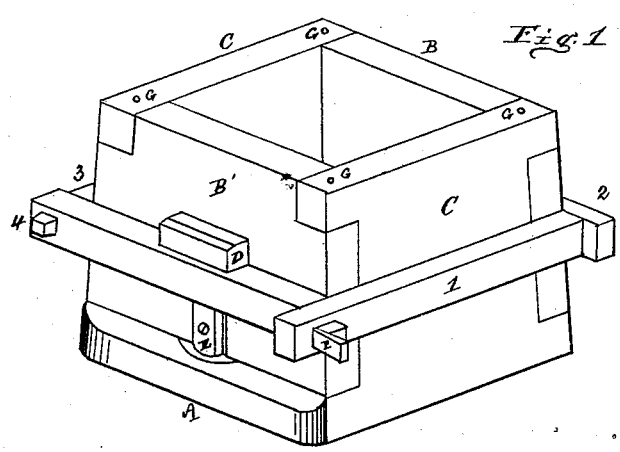
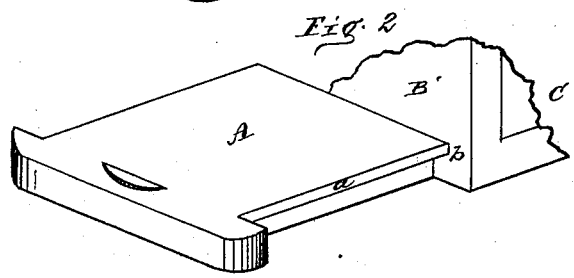
WITNESSES. INVENTOR.
 
THE GRAPHIC CO.PHOTO-LITH.39 & 41 PARK PLACE,N.Y.

UNITED STATES PATENT OFFICE.

PETER EBY, OF SALISBURY TOWNSHIP, (NEAR KINZER'S P. O.,) LANCASTER COUNTY, PENNSYLVANIA.

IMPROVEMENT IN TRANSPLANTING-BOXES.

Specification forming part of Letters Patent No. 160,088, dated February 23, 1875; application filed July 9, 1874.

*To all whom it may concern:*

Be it known that I, PETER EBY, of Salisbury township, near Kinzer's Post-Office, in the county of Lancaster and State of Pennsylvania, have invented certain Improvements in Raising Plants from Seed and setting them out, of which the following is a specification:

It is well known that the spongioles and finer particles of the roots suffer greatly when disturbed or torn off in transplanting seedlings or setting them out, by which their subsequent growth is greatly retarded, if not wholly interrupted.

The object of this invention is such that the soil in which the plant grew is set out, adhering to the plant, and thereby continuing its growth without interruption or rupture of the finer rootlets and spongioles adhering to the soil.

The accompanying drawing, with letters of reference marked thereon, represents a box used for the purpose, in which—

Figure 1 is a perspective view of a wooden box, framed so that each piece can be readily separated. Fig. 2 shows the flanged draw-bottom, entering grooves made along the lower inner side of the box or side pieces.

A brief explanation will enable any one of ordinary skill to make this box, of any desired size or material.

Two sides, C C, have the edge centrally boxed out, with its corners left to project, so as to fill up notches cut out of the other sides or ends B' B, and dovetailed or spliced at the corners, as shown, said end piece B' extending from above down upon the bottom only, and is provided with a stay-lug, D, as is also the opposite end B, about midway or centrally each way. These lugs are to hold the binding-pieces 1, 2, 3, and 4, to prevent them from slipping up on the slightly-beveled sides. When framed together, piece after piece is made so that the one end fits into a mortise in the other, the last being secured by a wedge, F, by which the frame is tightly drawn together around the box. There is also a turn-button, E, on the lower side of B', which sets into a rounded shouldered groove, e, made in the bottom A, to prevent it from being drawn out without first turning the lower end of the button out of the notch. This bottom A projects in front, having rounded projecting corners and a ledge or flange, a, on each side, which fit into grooves b near the lower inner edge of the side pieces C.

The boxes being somewhat wider below, the plants may be set out with the soil intact by simply withdrawing the bottom; but if branching, so as not to pass through without injury, the frame is readily removed, which allows the jointed or mortised sides to be taken apart and the contents set into the ground in mass.

These nursery-boxes are thus not only convenient for raising plants under shelter until the season for transplanting has arrived, but admirably adapted for transplantation by first preparing a place dug out to receive the soil and plant, thereby securing a more certain growth, especially desirable in choice seedlings raised under shelter.

I also show perforations made in the corners of the upper edge of the box for inserting rods to hinge the parts together, if preferable, to the frame.

Simple as this device may seem, of its utility there is no question. Nor am I aware that a box substantially like it was ever made or used for such a purpose prior to my invention and trial of the same.

I am aware that cups or boxes, open at both ends, have been used for transplanting, as well as boxes made with sliding sides and detached bottom for removing plants from the soil into such boxes. Such I do not claim; but

What I claim as my invention is—

The construction of the sides C, having projecting tongues to enter notches in the sides B B', forming framed corners, in combination with a sliding bottom, A, brace-framing 1, 2, 3, and 4, the whole substantially as and for the purpose specified.

PETER EBY.

Witnesses:
   M. B. FENNINGER,
   A. FLEMING SLAYMAKER.